United States Patent Office

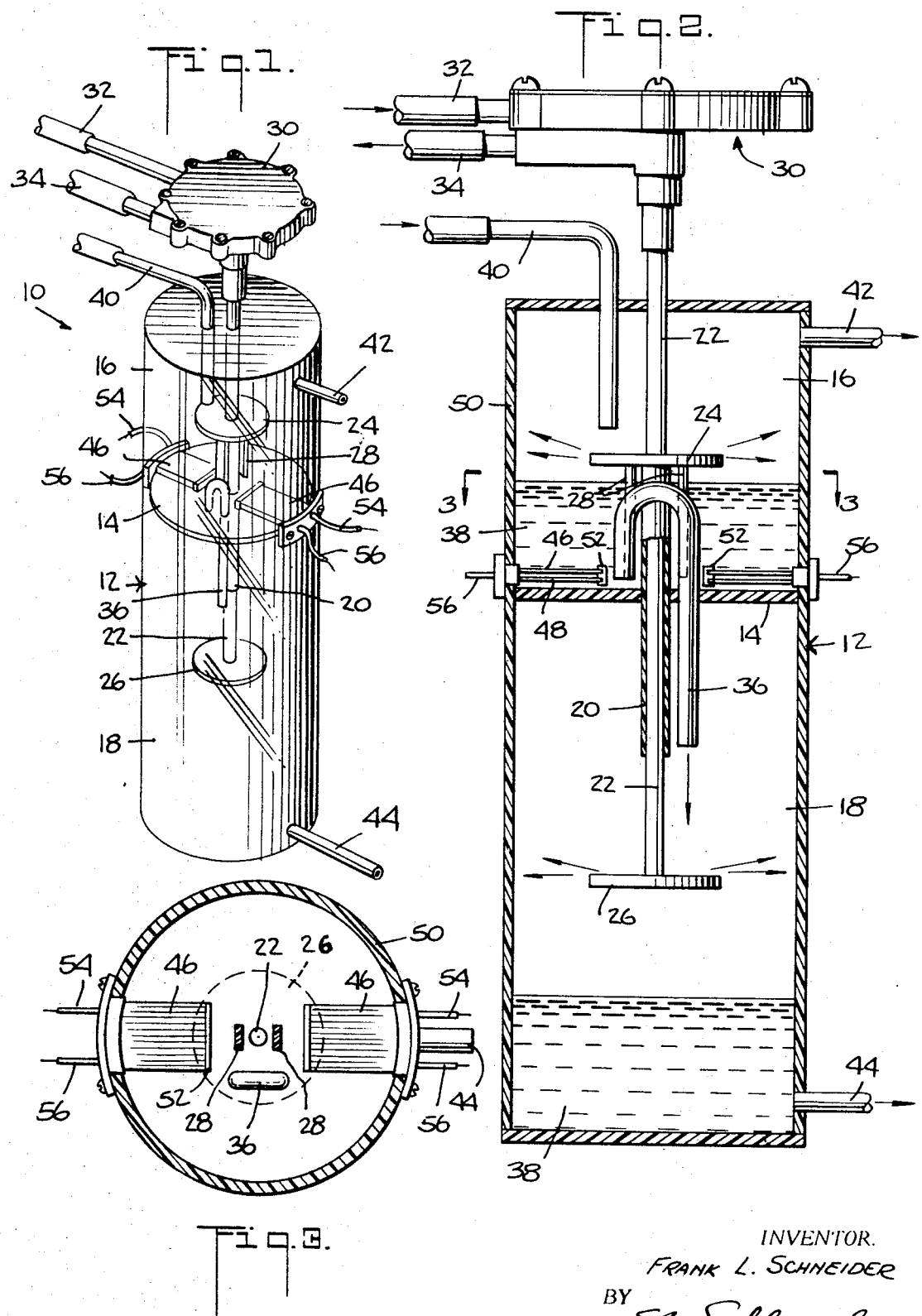

3,546,089
Patented Dec. 8, 1970

3,546,089
APPARATUS FOR THE CONTINUOUS ELECTROLYTIC PRODUCTION OF CHLORINE FOR THE STERILIZATION OF WATER
Frank L. Schneider, Port Washington, N.Y., assignor of one-half to Albert Young, Miami, Fla.
Filed June 4, 1969, Ser. No. 830,273
Int. Cl. B01k 3/00
U.S. Cl. 204—278         10 Claims

ABSTRACT OF THE DISCLOSURE

An apparatus for continuous electrolytic production of chlorine to sterilize water, comprising a non-conductive housing divided into an upper chamber and a lower chamber, a motor-turned shaft disposed through both chambers provided with a rotative disc for each chamber, a syphon affording liquid communication between the chambers, electrodes disposed in the upper chamber, a water inlet line disposed over the upper disc, the syphon outlet disposed over the lower disc, a gas exhaust line in the upper chamber and a water outlet line at the base of the lower chamber. The method of electrolyzing an electrically conductive solution by fragmentizing it before it reaches the electrodes, gathering the drops back into solution in the presence of the electrodes, refragmentizing the solution on leaving the electrodes and regathering the drops into solution.

---

This invention relates to the field of sterilization of water, e.g., in swimming pools and the like, and has for its objective the creation of an apparatus by which water (containing sodium chloride) is circulated, continuously if desired, through a housing provided with electrodes whose electrolytic action on the solution of water and sodium chloride results in the production of the chlorine necessary for sterilization, with means provided within the housing to break the continuity of the flow of water from the main source before it reaches the electrodes and after it leaves the electrodes on return to the main source, thereby progressively exposing an intermediate quantity of the solution to electrolysis while insulating the main stream from electrical contact.

In the present state of the art the water in, e.g., swimming pools is sterilized by the addition, from time to time, of a sterilizing agent, such as chlorine or compounds of chlorine. The activity of the chlorine depends on the formation of the OCl ion, and this is usually supplied by hypochlorous acid, sodium hypochlorite or calcium hypochlorite. When this is done numerous problems and difficulties arise, among which the following may be noted: (1) The use of chlorine gas involves the employment of precautions incident to the handling of a very toxic gas; (2) The reaction of the chlorine in the water produces hydrochloric and hypochlorous acids which must be neutralized to maintain the proper pH of pool water, and this usually requires the addition of an alkali, such as soda ash (sodium carbonate) to the water from time to time; (3) The continuous neutralization of the acid results in the constant increase and accumulation of salt in pool water. The pool water must therefore be replaced more or less frequently, at intervals; and (4) Pool water must be tested continuously at intervals for pH and chlorine content to insure that it contains the requisite concentration of chlorine without irritating or injurious excesses.

These disadvantages and difficulties, among others, are obviated by the present invention, which provides a means for the continuous chlorination of the pool water without increasing the salt content, without requiring constant neutralization of the acidity created by present methods, and by completely eliminating the need for intermittent replacement of the water itself.

It is, therefore, the principal object of my invention to provide an apparatus for the continuous chlorination of water by means of electrolytic action employing sodium chloride as the electrolyte, dissolved in the water being sterilized or in seperate solution.

A second important object of my invention lies in the provision of an apparatus by which a designated quantity of water forming part of the main stream is successively isolated and insulated from the main stream while being subjected to electrolysis.

A third important object of my invention lies in the provision of an apparatus for the continuous chlorination of water by electrolysis of the dissolved salt while providing insulation of the main body of water from electrical contact with the electrodes.

A fourth important object of my invention lies in the provision of an apparatus of the type described which will allow the maintenance of a constant pH content of the pool water.

A fifth important object of my invention lies in the provision of an apparatus of the type described which will prevent any increase of salt content in the recirculated water by the repeated re-use of the salts in conversion to sodium hypochlorite, thereby eliminating the need for intermittent replacement of the water.

Still another important object of my invention lies in the creation of an apparatus of the type described which is inexpensive to produce, durable, and simple to operate.

These and other salient objects, advantages and functional features of my invention, together with the novel features of construction, composition and arrangement of parts, will be more readily apparent from an examination of the following description, taken with the accompanying drawings, wherein:

FIG. 1 is a top, perspective view of a preferred embodiment of my invention;

FIG. 2 is an enlarged, side cross-sectional view of the embodiment shown by FIG. 1; and FIG. 3 is a cross-sectional view, taken on lines 3—3 of FIG. 2.

Similar reference characters designate similar parts throughout the different views.

Illustrative of the embodiment shown in the drawings, the apparatus 10 comprises a housing 12 subdivided by a divider element 14 into an upper chamber 16 and a lower chamber 18. The housing 12 and divider element 14 are composed of a hydrophobic plastic material, such as polyethylene, silicone or the like. It may, instead, be lined with such, or similar, material. A hollow cylinder 20 is disposed axially through the divider element 14 and a shaft 22 is freely disposed through the cylinder 20, the shaft 22 provided with fixed circular discs 24 and 26 which rotate with the rotation of the shaft 22, the disc 26 being mounted transverse the axis of the shaft 22 at its lower extremity and within the chamber 18, and the disc 24 likewise mounted transverse the axis of the shaft 22, within the chamber 16, at a point thereon where its abutment against the upper edge of the cylinder 20, well above the surface of the divider element 14, serves to maintain the fixed position of the shaft 22 within the housing 12. The base, or undersurface, of the disc 24 is provided with stirrer elements 28 extending perpendicularly therefrom to reach but not touch the divider element 14.

The upper end of the shaft 22 extends through an opening in the roof of the chamber 16 and is secured to and turned by a water turbine motor 30 actuated by a water stream from the main source forced into the motor 30 through the inlet line 32 and out through the outlet line 34, back to the main source. A syphon 36 is disposed eccentrically through the divider element 14, clear of the stirrer elements 28 and below the disc 24, to allow water 38 to flow from the chamber 16 into the chamber 18 upon reaching a predetermined level in the former, the lower end of the syphon 36 being so disposed that the water passing therethrough falls directly upon the upper surface of the disc 26. A water inlet line 40 is disposed through the roof of the chamber 16, positioned so that water entering the chamber 16 therefrom falls directly upon the upper surface of the disc 24, and the wall of the chamber 16 is further provided with a gas outlet line 42 adjacent the roof thereof, for the purposes to be hereinafter disclosed, while the chamber 18 is provided with a water outlet line 44 near its base.

Within the chamber 16 there are provided a plurality of pairs of electrodes 46 and 48, secured to the wall 50 and extending toward the center of the chamber 16, disposed parallel wtih and adjacent to the divider element 14, with the electrodes 46 and 48 maintained in spaced, parallel relationship to each other by means of an insulated keeper 52, and respectively connected by leads 54 and 56 to a suitable source of electric power (not shown).

For the operation of my invention, in the case of a swimming pool, the inlet line 40 and the inlet line 32 are connected to a pump (not shown), with a filter system (likewise not shown) intermediate the line 40 between the pump and the housing 12, the lines 40 and 32 being of such diameter respectively as to provide the necessary operational streams of water, with the water drawn from the main body of pool water. Where the pool contains sweet water the addition of the required amount of sodium chloride is necessary, to form the electrolyte. Where the pool is filled with sea water no such addition is required, since the water is already provided with the necessary sodium chloride. The electrodes are likewise connected to a suitable source of electric power (not shown) and the outlet line 44 to a suitable suction pump (not shown), where necessary.

Upon the actuation of the pumps and electrodes the motor 30, driven by the stream of water forced therethrough, rotates the shaft 22 thereby spinning the discs 24 and 26. The stream of source water from the pool, entering the chamber 16 through the inlet line 40 falls upon the spinning disc 24 and is thereby thrown centrifugally toward the wall 50 of the chamber, causing the stream to be broken up into many discrete drops, thus providing the necessary discontinuity of liquid from the main stream from the liquid to be electrolyzed. Furthermore, as the drops strike the hydrophobic surface of the wall 50 they do not coalesce easily. This provides a further break or gap in electrical connection.

The drops of water drain to and collect at the bottom of the chamber 16, where they reform as liquid in contact with the electrodes 46 and 48. Here electrolysis takes place in accordance with the reactions:

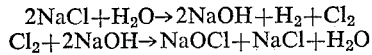

$$2NaCl + H_2O \rightarrow 2NaOH + H_2 + Cl_2$$
$$Cl_2 + 2NaOH \rightarrow NaOCl + NaCl + H_2O$$

and the stirrer elements 28 provide instant and thorough mixing of the sodium hydroxide and the chlorine produced in the electrolysis, with the released hydrogen gas drawn out of the chamber 16, through the gas line 42, to an outside disposal point. With the accumulation of sufficient liquid 38 in the chamber 16 to be effectively electrolyzed, the liquid reaches a height in the chamber 16 where it effectively drains out of the chamber 16, through the syphon 36, into chamber 18, where it falls upon the spinning disc 26, which repeats the separation of the treated stream into discrete drops by throwing them against the wall of the chamber 18, to drain to the bottom of the chamber from which it is drawn out through the outlet line 44 and back into the main stream or pool to sterilize the remaining water.

By the continuous operation of this apparatus the chlorine produced continually sterilizes the water, with the reaction resulting in the reproduction of sodium chloride which is then again available for electrolysis into sodium hypochlorite. In this way there results no accumulation of excessive sodium chloride in the water and the water consequently does not have to be replaced, since the quantity never becomes objectionable. Furthermore, the pH of the pool remains constant since no acids are formed and therefore no neutralization agents are necessary. Finally, automatic control of chlorine content is made possible through chlorine-measuring instruments which can be used to provide automatic control of the operation of the electrolytic apparatus, thereby obviating frequent testing.

For sterilization of drinking water the sodium chloride electrolyte solution is provided from a separate source and the effluent from the apparatus described is fed into the main stream of water to be sterilized.

While I have described hereinabove a preferred embodiment of my invention, it is obvious that various changes in the construction, composition and arrangement of parts may be made by way of modification, within the concept and scope of the invention. For example, while the electrodes 46 and 48 shown are plates, they may as well be rods of graphite, noble metals or the like. They may be continuous, perforated or guazes. They may comprise a single pair or a plurality of pairs, depending on the results desired and the size of the pool. They may also be staggered in positions, to improve mixing, or even rotative. With respect to the discs 24 and 26, while only one disc is shown in each of the chambers, provided with a flat surface, more than one disc may be employed in each chamber, with the same or varied diameters, and the surfaces may, instead, be fluted or otherwise contoured or grained to improve the formation of drops.

It is also to be noted that, while a preferred use of my invention is in the production of chlorine for sterilization purposes, it may as well be employed for other purposes where electrolysis of a conductive solution is desired, where insulation of the electrodes from the main body of the solution is necessary.

From the foregoing it is therefore obvious that the embodiment shown and described is by way of illustration and not of limitation, and that various changes may be made, as above indicated, without limitation upon or departure from the spirit and scope of the invention, or sacrificing any of the advantages thereof inherent therein, all of which are claimed.

Having described my invention, I claim:

1. An apparatus for the electrolysis of an electrically conductive solution, comprising a non-conductive housing, electrolytic means disposed within the housing, means to circulate the solution through the housing, means to expose successive amounts of the solution to electrolysis, means to release by-products of electrolysis from the housing, and means to fragmentize the solution into electrically non-conductive discrete drops before reaching and after leaving the electrolytic means.

2. An apparatus as described in claim 1, the housing being composed of an hydrophobic material and subdivided by a divider element into an upper chamber and a lower chamber, with the electrolytic means disposed in the lower portion of the upper chamber.

3. An apparatus as described in claim 2, the electrolytic means comprising a pair of electrodes adapted to be connected to a source of electric current.

4. An apparatus as described in claim 2, the electrolytic means comprising a plurality of pairs of electrodes adapted to be connected to a source of electric current.

5. An apparatus as described in claim 3, the means to circulate the solution through the housing comprising an inlet line provided through the roof of the upper chamber and an outlet line provided near the base of the lower chamber.

6. An apparatus as described in claim 5, the means to expose successive amounts of the solution to electrolysis and to insulate the solution entering and leaving the housing from electrical contact with the electrodes comprising a hollow cylinder disposed axially through the divider element, a shaft freely disposed through the cylinder and rotatable therein, a first disc fixedly mounted on the lower end of the shaft transverse its axis and disposed within the lower chamber, a second disc fixedly mounted on the shaft intermediate its ends and transverse its axis, and disposed within the upper chamber, the upper end of the shaft extending out of the roof of the upper chamber, a motor in engagement with the upper end of the shaft adapted to rotate the shaft and spin the discs, and a syphon disposed through the divider element and adapted to allow solution to drain from the upper chamber into the lower chamber upon reaching a preselected level in the upper chamber, with the inlet line of the upper chamber disposed over the second disc and the outlet end of the syphon disposed over the first disc.

7. An apparatus as described in claim 6, the means to release by-products of the electrolysis comprising a gas outlet line disposed through the wall of the upper chamber near its roof.

8. An apparatus as described in claim 7, the second disc being provided with stirrer elements rotative with the disc and extending perpendicularly from its lower surface to the base of the upper chamber but not in contact with the said base.

9. An apparatus as described in claim 8, the discs being provided with fluted upper surfaces.

10. An apparatus as described in claim 8, the discs being provided with corrugated upper surfaces.

References Cited

UNITED STATES PATENTS

| | | | |
|---|---|---|---|
| 591,730 | 10/1897 | Bein | 204—149 |
| 723,398 | 3/1903 | Le Sueur | 204—98 |
| 2,414,741 | 1/1947 | Hubbard | 204—275 |
| 2,669,122 | 2/1954 | Silsby, Jr. | 204—275 |
| 2,673,232 | 3/1954 | Silsby, Jr. | 204—275 |

JOHN M. MACK, Primary Examiner

A. C. PRESCOTT, Assistant Examiner

U.S. Cl. X.R.

204—149, 275